Dec. 1, 1953
H. J. HEPP
2,661,384
ISOMERIZATION PROCESS
Filed Oct. 14, 1949
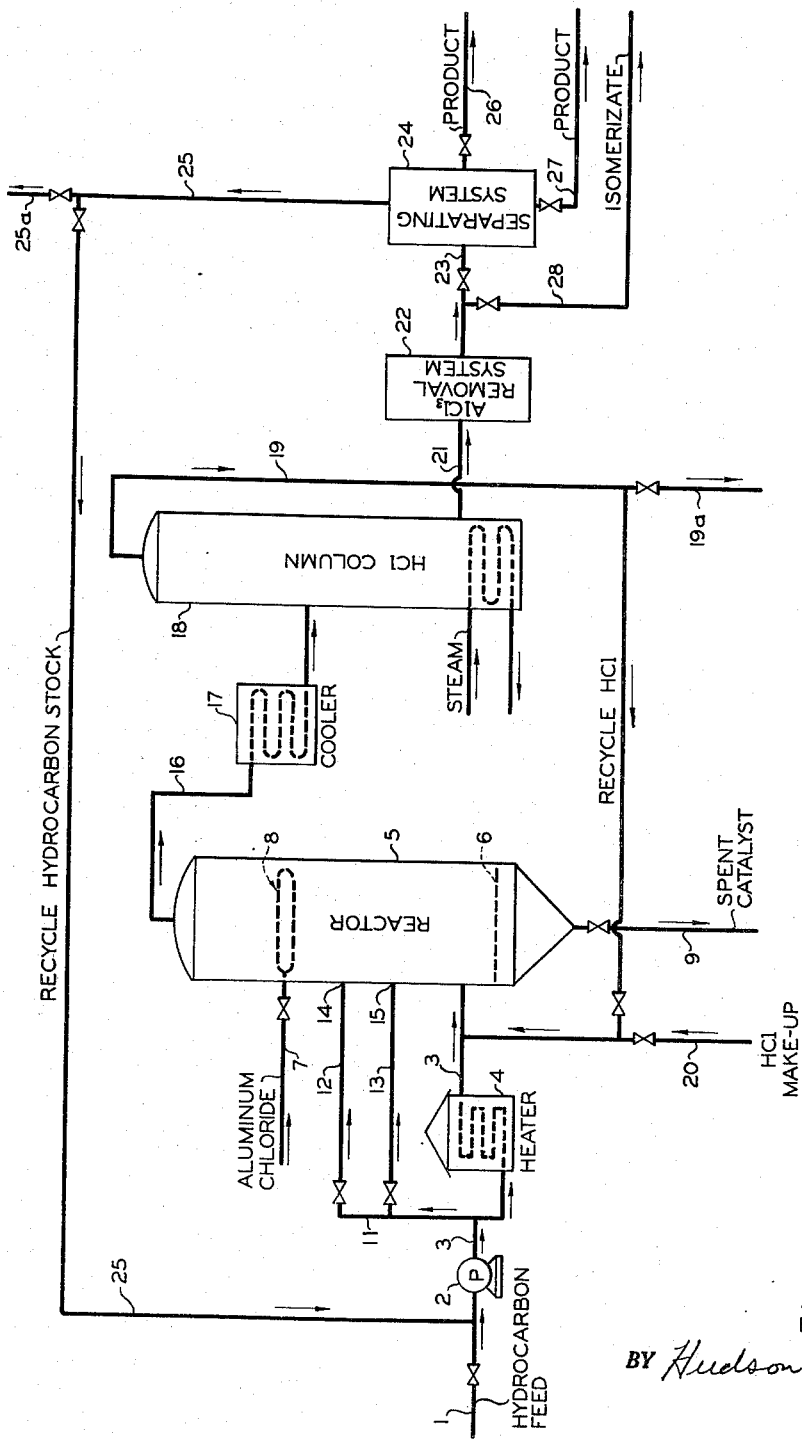
INVENTOR.
H. J. HEPP
BY Hudson and Young
ATTORNEYS Patented Dec. 1, 1953

2,661,384

UNITED STATES PATENT OFFICE 2,661,384

ISOMERIZATION PROCESS

Harold J. Hepp, Bartlesville, Okla., assignor to Phillips Petroleum Company, a corporation of Delaware Application October 14, 1949, Serial No. 121,303

8 Claims. (Cl. 260—683.5)

This invention relates to the catalytic isomerization of hydrocarbons. In one embodiment it relates to the conversion of paraffinic hydrocarbons to more highly-branched paraffinic hydrocarbons by use of the Friedel-Crafts type catalyst. In a more specific embodiment this invention relates to a process for isomerizing normal paraffins, such as normal pentane and normal hexane, to isoparaffins by use of an aluminum chloride-hydrocarbon complex catalyst.

This invention provides an economical and efficient process for isomerizing $C_5$ and higher-boiling paraffin and naphthene hydrocarbons. Paraffins, such as n-pentane, n-hexane, methylpentanes, n-heptane, methylhexanes, etc., are converted with high efficiency into more highly-branched isomers. Naphthenes, such as methylcyclopentane and methylcyclohexanes, are converted into 5- and 6-membered ring isomers. As known to those skilled in the art, paraffins and naphthenes are saturated hydrocarbons.

By the process of this invention $C_5$ and higher-boiling paraffin and naphthene hydrocarbons are isomerized by use of the Friedel-Crafts type catalyst, such as aluminum chloride and aluminum chloride-hydrocarbon complex catalysts, under suitable conditions of temperature and pressure in a vertical, elongated reactor. The lower portion of the reactor contains a bed of granular material, such as bauxite, supporting a suitable catalyst, such as an aluminum chloride-hydrocarbon complex catalyst, while the upper portion contains a bed of adsorptive material, such as bauxite. Fortified aluminum chloride-hydrocarbon complex catalyst, for example, enters the upper portion of the reactor and flows downward over the granular material. Hydrocarbon feed enters the bottom of the reactor and flows upward through the descending catalyst, and continues to pass through the upper bed of adsorptive material where at least some of the catalyst dissolved in the hydrocarbon is removed. The isomerizate or treated hydrocarbon material passes from the top of the reactor for further treatment as desired. The spent catalyst is removed from the bottom of the reactor and may be refortified by addition of aluminum chloride or the like and recycled to the process. In this process the reaction rate is kept at desirably high levels, for as the hydrocarbon stream is isomerized it contacts increasingly active catalyst. Cold hydrocarbon feed may be introduced at one or more points at different levels along the length of the reactor to create or maintain a decreasing temperature gradient along the reactor, thus permitting the use of relatively high temperatures for the low activity catalyst in the lower portion of the catalyst bed where isomerizate composition is far from equilibrium, and progressively cooling the up-flowing stream as it meets the more active down-flowing catalyst, thus displacing the equilibirum in the direction of higher isomer content; both of these factors tending to maintain high isomerization rates.

It is an object of this invention to provide an improved catalytic hydrocarbon isomerization process.

Another object is to provide an improved hydrocarbon isomerization process in which the Friedel-Crafts type catalyst is used.

Still another object of this invention is to provide an isomerization process wherein the isomerization reaction rate is kept at a desirably high level.

Still a further object of this invention is to provide an improved isomerization process wherein the hydrocarbon stream contacts increasingly active catalyst as the hydrocarbon stream passes through a portion of the reaction chamber.

Still a further object is to provide an isomerization process wherein a decreasing temperature gradient is maintained in the reaction zone.

Other objects and advantages of this invention will be apparent to one skilled in the art by the accompanying disclosure and description.

In order to describe this invention in more detail, reference will now be made to the accompanying drawing which comprises a schematic flow-diagram illustrating one mode of practicing the process of this invention.

Now referring to the drawing, a suitable hydrocarbon charge stock, such as normal pentane or the like, enters the system through line 1 from any suitable source and is mixed with recycled stock from line 25, and the resulting mixture is pumped by means of pump 2 through line 3 and heater 4 to reactor 5. Hydrogen chloride is introduced from line 20 into the hydrocarbon feed passing through line 3. The hydrocarbon feed rate to reactor 5 is in the range of 0.2 to 3 volumes per volume of packing or granular material (to be discussed later) per hour. In heater 4 the temperature of the hydrocarbon stream is raised to a suitable value in the range of from about 125° F. to about 325° F., depending upon the composition of the charging stock, the rate of $AlCl_3$ addition, and the throughput rate. The pressure developed by pump 2 is sufficient to maintain the reaction mixture entering reactor 5 substantially in the liquid phase, and will normally range from about 200 p. s. i. g. to 800 p. s. i. g., depending upon the temperature of the reactor feed and other factors, such as HCl content and the hydrogen content, if used, of the reactor feed, and the like.

The lower portion of reactor 5 is packed with a solid, granular material of suitable mesh size to permit AlCl₃-hydrocarbon complex to drain therethrough, and may be in the range from about 1 to 20 mesh. However, it is desirable that in any one charge, the mesh size be fairly uniform. This granular material is supported on perforated plate 6 positioned near the bottom of reactor 5. The packing or granular material is advantageously bauxite which has been dehydrated, prior to installation, at a temperature in the range of about 500–1,000° F., and has a bound water content in the range of about 1 to 2 per cent, and which has been treated with HCl after installation to remove corrosive aqueous products. Other materials, such as pumice, quartz chips, and the like, may be used to pack reactor 5 below the AlCl₃ introduction point through line 7. However, the upper portion of reactor 5, that is the portion above line 7, should be packed with a highly adsorptive material, such as bauxite or activated charcoal, to adsorb dissolved aluminum chloride from the up-flowing hydrocarbon material.

Aluminum chloride is added to reactor 5 through line 7, and is distributed uniformly over the cross-section of the reactor by a suitable distributor 8. The aluminum chloride catalyst may be added in any suitable form, such as by adding aluminum chloride to the spent catalyst drained from reactor 5 through line 9, and pumping the fortified catalyst complex into line 7 by a line not shown, or aluminum chloride may be suspended in a rapidly moving stream of hydrocarbon charge and the resulting slurry pumped into the reactor through line 7, or a low-melting mixture of aluminum chloride and other salts, e. g. antimony trichloride, potassium chloride and the like, may be pumped into the system through line 7.

The aluminum chloride catalyst added through line 7 flows downwardly in contact with and countercurrent to the up-flowing hydrocarbon stream thereby isomerizing the hydrocarbons. As the catalyst progresses downwardly through reactor 5 additional aluminum chloride is converted to a hydrocarbon complex, thus reducing the activity of the catalyst. Thus, the catalyst activity continuously decreases as it passes downwardly through the reactor, being highest at the point where the aluminum chloride enters through line 7, and lowest at the bottom of the reactor. This distribution of catalyst activity is particularly advantageous in many cases, since isomerization rate tends to decrease as equilibrium is approached; and in the present arrangement, the progressively more highly isomerized products are progressively contacted with the more active catalyst, thereby tending to keep isomerization rate high.

If desirable, a portion of the cold hydrocarbon feed may be introduced at one or more points along the side of reactor 5. For example, a part of the cold feed may pass from line 3 through line 11 and into reactor 5 through lines 12 and 13 at points 14 and 15, respectively, for the purpose of creating a decreasing temperature gradient along the reactor. By this procedure, relatively high temperatures are obtained for the low activity catalyst in the lower portion of the reactor where isomerizate composition is far from equilibrium, and the up-flowing stream is progressively cooled, thus displacing the equilibrium in the direction of higher isomer content; both of these factors tending to maintain high isomerization rates.

The spent catalyst in the bottom part of reactor 5 acts as a feed pretreating agent by reacting with or dissolving hydrocarbon feed impurities, such as sulfur compounds, olefins, or the like, which impurities have a deleterious effect on the more active catalyst higher in the reactor.

The spent catalyst-complex which drains from the reaction bed in the lower portion of reactor 5 is removed from reactor 5 through line 9. The aluminum chloride content of the spent catalyst may be recovered for re-use, by means not shown, by heating in a suitable autoclave to temperatures of 650–800° F. and recovering aluminum chloride from the vaporous products.

The effluent from the top of reactor 5 passes through line 16 and cooler 17 to column 18 where HCl is separated from the reactor effluent and recycled to the reactor feed by way of line 19. If desired a portion of the HCl may be removed from the system through line 19a. In some cases where reactor 5 is so operated that insufficient light products are generated, some propane or butane may be added to the HCl column feed, by means not shown, in order to reduce the kettle temperature of this column, and also to improve the HCl separation from the kettle product.

Make-up HCl may be added to the system through line 20, or may be generated in the process by adding the required amount of steam to the bottom of reactor 5 by means not shown. The exact amount of HCl required varies with the feed and operating conditions, but in most cases will be in the range of 1 to 5 per cent by weight of the feed.

The effluent from the bottom of HCl column 18 passes through line 21 to aluminum chloride removal system 22. This system may comprise, for example, a caustic washing system to remove dissolved AlCl₃ and HCl, or it may be a distillation system, wherein the effluent is distilled to recover an overhead product free of aluminum chloride, and a bottoms product in which aluminum chloride is concentrated. This aluminum chloride concentrate may be recycled to reactor 5 by means not shown. The overhead product in this latter case would be washed with caustic to remove HCl.

If no hydrocarbon recycle is to be used in the process, the hydrocarbon or isomerizate product from system 22 may be taken directly to storage via lines 23 and 28. However, if recycling is to be practiced, the hydrocarbon product passes via line 23 to separation system 24 where it is fractionated to produce a suitable recycle stream, which is returned to reactor 5 via line 25, and one or more product streams as desired which are removed from the system through lines 26 and 27. If desired, a portion of the recycle stock or higher materials may be removed from the system through line 25a.

In the accompanying diagrammatic drawing reference to some of the equipment, such as pumps, gauges and the like, which obviously would be necessary to actually operate the process have been intentionally omitted. Only sufficient equipment has been shown to illustrate the process and it is intended that no undue limitation be read into this invention by reference to the drawing and discussion thereof.

The process as described may be used to efficiently isomerize $C_5$ and higher-boiling hydrocarbons, preferably hydrocarbons having a boiling point in the gasoline boiling range, which are substantially free of olefins, and preferably do not contain more than 5 per cent of aromatics.

The n-paraffins, themselves, when in a pure state, usually require the presence of certain added substances, or "inhibitors," to prevent disproportionation reactions which result in the formation of products of both lower and higher molecular weight than the original hydrocarbon. Inhibitors which have been found to be effective for this purpose are cycloparaffins, aromatics in small amount, and hydrogen. Frequently, mixtures of these inhibitors are more effective than a single component. Aromatics are usually less preferred as inhibitors for reasons to be discussed.

Preferred feed stocks for the process of the present invention, i. e., the reactor feed after admixture of recycle stock, comprise paraffinic hydrocarbon materials which contain 25 per cent or less, and preferably 5 to 15 per cent, of cycloparaffins, and only a small amount, if any, of aromatics. While this process, because of the purifying action carried out in the lower portion of reactor 5, as previously described, has considerable tolerance for otherwise deleterious impurities, it is preferred to keep the aromatics content of the feed as low as is commercially feasible, since any aromatics reaching the site of the higher concentrations of the catalyst causes accelerated loss of aluminum chloride and decreases the isomerization rate. Hydrogen may also be present in the feed stock.

By way of illustration the following charging stocks are particularly suitable for use in the process of this invention: A mixture comprising approximately 75 per cent n-pentane, 19.5 per cent n-hexane, 5 per cent methylcyclopentane and 0.5 per cent benzene. Such a mixture may be obtained by adding 3 parts of n-pentane to 1 part of a commercial n-hexane cut. Another suitable mixture is a narrow-boiling hexane cut comprising 80 per cent n-hexane, 18 per cent methylcyclopentane plus cyclohexane, and 2 per cent benzene. Still another suitable mixture is a narrow-boiling n-heptane cut containing about 20 per cent cycloparaffins, and which has been substantially freed of aromatics by preliminary treatment, such as by selective solvents, silica gel or by hydrogenation. With stocks such as these, the cycloparaffin content of the reactor feed can be adjusted over a wide range by suitable control of per-pass conversion and amount of recycle. Another suitable feed stock is a butane-free, 270° F. end-point straight-run gasoline which has been freed of aromatics, and in which the cycloparaffin content of the reactor feed is maintained in the range of 10 to 25 per cent either by use of extraneous isomerizable paraffins or by control of conversion and recycle. It is preferable that the hydrocarbons charged to the process of my invention contain at least 4 and not more than 10 carbon atoms per molecule.

The following example will further illustrate my invention:

A feed stock comprising 3 volumes of n-pentane and 1 volume of a narrow-boiling commercial hexane cut, the mixture having the composition shown in Table I, was pumped together with 4 per cent by weight of HCl into the bottom end of a vertical reaction tube 1½ inches I. D. by 60 inches long containing 38¾ inches (1090 ml.) of catalyst, at 280 p. s. i. g. and at a rate of ½ volume per volume of catalyst per hour.

The catalyst was prepared by calcining bauxite for 4 hours at 900° F., and adding to the cooled bauxite 25 per cent by weight of a fluid AlCl₃-hydrocarbon complex obtained from a previous isomerization run, and which contained about 55 per cent by weight of AlCl₃.

This catalyst was placed in the reactor and the remaining upper portion of the tube filled with the dried bauxite not containing the catalyst-complex. The catalyst tube was heated by an oil bath over the bottom 39 inches. The top part of the tube was not heated. The oil bath temperature was held at 250° F.

Aluminum chloride in the form of a fortified complex, made by adding sufficient AlCl₃ to the spent complex from the reactor to bring its AlCl₃ content to 85 per cent, was added to the reactor at the rate of 1 pound of added AlCl₃ per barrel of feed at a point 40 inches above the bottom of the reactor. The isomerizate was withdrawn from the top of the reactor through a back-pressure valve, freed of HCl and analyzed. Spent complex was withdrawn from the bottom of the reactor.

The summarized operating conditions, feed and products analysis together with knock-rating data are given in Table I.

Thirty-eight per cent of the n-pentane present in the feed was converted into isopentane, and 3 per cent into isobutane and other products. Approximately 46 per cent of the n-hexane present was isomerized with high efficiency into isohexanes, which are largely 2 and 3 methylpentane, but some neohexane and diisopropyl are also formed. Approximately 70 per cent of the methylcyclopentane present was reacted, approximately 60 per cent of the reacting methylcyclopentane being converted into cyclohexane, and the balance largely into substituted cyclohexanes.

Table I

| | |
|---|---|
| Feed composition, weight per cent: | |
|     n-Pentane | 73.0 |
|     Isohexanes | 1.2 |
|     n-Hexane | 19.3 |
|     Methylcyclopentane | 5.7 |
|     Benzene | 0.8 |
| Reactor temperature, °F | 250 |
| Reactor pressure, p. s. i. g | 280 |
| Contact time, minutes | 65 |
| Space velocity | 0.5 |
| HCl, weight per cent of feed | 4.0 |
| Fresh AlCl₃ addition rate, #AlCl₃/barrel feed | 1.0 |
| Catalyst composition, weight per cent AlCl₃, in | 80–85 |
| Catalyst composition, weight per cent AlCl₃, out | 55–56 |
| Effluent composition, weight per cent: | |
|     Butanes | 1.1 |
|     Isopentane | 27.7 |
|     n-Pentane | 42.9 |
|     Isohexanes | 10.1 |
|     n-Hexanes and heavier | 18.2 |
| Pentane conversion, weight per cent | 41.0 |
| Pentane efficiency, weight per cent | 92.0 |
| Hexane conversion, weight per cent | 46.0 |
| ASTM octane No. feed, clear | 58.8 |
| Research octane No. feed, clear | 58.9 |
| ASTM octane No. effluent, clear | 70.0 |
| Research octane No. effluent, clear | 72.6 |
| Reactor: | |
|     I. D., inches | 1.5 |
|     Total length, inches | 60.0 |
|     Catalyst length, inches | 38¾ |
|     Total volume ml | 1730 |
|     Catalyst volume ml | 1090 |

It is to be understood that this invention should not be unnecessarily limited to the above

I claim:

1. A process for the isomerization of a normally liquid hydrocarbon material, which comprises introducing a saturated hydrocarbon material containing at least 4 and not more than 10 carbon atoms per molecule into a lower portion of a vertical elongated reaction zone maintained at a temperature in the range of 125-325° F. and under a pressure in the range of 200 to 800 p. s. i. g., maintaining in the lower portion of said reaction zone a solid granular adsorptive material supporting an aluminum chloride-hydrocarbon complex catalyst, maintaining in the upper portion of said reaction zone a bed of solid granular adsorptive material, introducing into the upper portion of said reaction zone an aluminum chloride-hydrocarbon complex catalyst just below said bed of said adsorptive material contained in the upper portion of said reaction zone, passing said catalyst downwardly through said reaction zone in contact with and countercurrent to the flow of said hydrocarbon material whereby said hydrocarbon material progressively comes in contact with more active catalyst as it passes through said reaction zone to the point of entry of said catalyst, continuing the flow of the treated hydrocarbon material upwardly through said reaction zone and in contact with said adsorptive material contained in the upper portion thereof whereby a portion of the aluminum chloride dissolved in said hydrocarbon material is adsorbed by said adsorptive material, maintaining an upwardly decreasing temperature gradient in the lower portion of said reaction zone containing the catalyst bed by introducing a portion of said saturated hydrocarbon material into said reaction zone through at least two points at different elevations in said reaction zone, removing spent catalyst from a point near the bottom of said reaction zone and recovering a treated hydrocarbon material as a product of the process.

2. The process of claim 1 wherein said adsorptive material used in the upper and lower portions of said reactor is bauxite.

3. The process of claim 1 wherein said hydrocarbon material is normal pentane.

4. The process of claim 1 wherein said hydrocarbon material comprises a mixture of normal pentane and normal hexane.

5. An improved process for the isomerization of normally liquid hydrocarbons, which comprises introducing a saturated hydrocarbon material containing at least 4 and not more than 10 carbon atoms per molecule into a lower portion of a vertical elongated reaction zone maintained at a temperature in the range of 125-325° F. and under a pressure sufficient to maintain a liquid phase, maintaining in the lower portion of said reaction zone a solid granular adsorptive material supporting an aluminum chloride-hydrocarbon complex catalyst, maintaining in the upper portion of said reaction zone a bed of solid granular adsorptive material, introducing into said reaction zone an aluminum chloride-hydrocarbon complex catalyst at the upper portion thereof and just below said bed of said adsorptive material contained in the upper portion of said reaction zone, passing said catalyst downwardly through said reaction zone in contact with and countercurrent to the flow of said hydrocarbon material whereby said hydrocarbon material progressively comes in contact with more active catalyst as it passes through said reaction zone to the point of entry of said catalyst, continuing to pass the treated hydrocarbon material upwardly through said reaction zone and in contact with said adsorptive material contained in the upper portion thereof whereby a portion of the aluminum chloride dissolved in said hydrocarbon material is adsorbed by said adsorptive material, maintaining an upwardly decreasing temperature gradient in the lower portion of said reaction zone containing the catalyst bed by introducing a portion of said hydrocarbon material into said reaction zone through at least two points at different elevations in said reaction zone, removing spent catalyst from the bottom portion of said reaction zone and recovering an isomerate from the top portion of said reaction zone.

6. A process for the isomerization of a saturated hydrocarbon material, which comprises passing a hydrocarbon material containing at least 4 and not more than 10 carbon atoms per molecule and maintained at a temperature in the range of 125-325° F. to the lower portion of a vertical, elongated reaction zone, maintaining in the lower portion of said reaction zone a bed of solid granular adsorptive material supporting a Friedel-Crafts type catalyst, maintaining in the upper portion of said reaction zone a bed of granular adsorptive material, introducing the Friedel-Crafts type catalyst in the upper portion of said reaction zone just below said bed of said adsorptive material contained in the upper portion of said reaction zone, passing said catalyst downwardly through said reaction zone in contact with and countercurrent to said heated hydrocarbon material, maintaining a decreasing temperature gradient in said reaction zone by introducing a portion of the unheated hydrocarbon material into the lower portion of said reaction zone containing the catalyst bed at at least one point above the point of entry of said heated hydrocarbon material.

7. An improved process for the isomerization of normally saturated liquid hydrocarbon materials, which comprises introducing a hydrocarbon material containing at least 4 and not more than 10 carbon atoms per molecule into a lower portion of a vertical elongated reaction zone maintained at a temperature in the range of 125-325° F. and under a pressure sufficient to maintain a liquid phase, maintaining in the lower portion of said reaction zone a solid granular adsorptive material supporting a Friedel-Crafts type isomerization catalyst, maintaining in the upper portion of said reaction zone a bed of solid granular adsorptive material, introducing into said reaction zone a Friedel-Crafts type isomerization catalyst just below the bed of said adsorptive material contained in the upper portion of said reaction zone, allowing said introduced catalyst to flow downwardly in said reaction zone in contact with and countercurrent to the flow of said hydrocarbon material whereby said hydrocarbon material progressively comes in contact with more active catalyst as it passes through said reaction zone to the point of entry of said catalyst, maintaining an upwardly decreasing temperature gradient in the lower portion of said reaction zone containing the catalyst bed by introducing a portion of said saturated hydrocarbon material into said reaction zone through a plurality of points at different elevations in said reaction zone, allowing the treated hydrocarbon to continue to pass upwardly through said reaction zone and contacting said adsorptive material contained in the upper portion thereof whereby a portion of said catalyst dissolved in said hydrocarbon material is adsorbed by said adsorptive material, removing the spent catalyst from the bottom portion of said reaction zone and recovering a treated hydrocarbon material as a product of the process.

8. An improved process for the isomerization of $C_5H_{12}$ and higher-boiling saturated hydrocarbons, which comprises introducing said saturated hydrocarbons into a lower portion of a vertical elongated reaction zone maintained at isomerization conditions of temperature and pressure, maintaining in the lower portion of said reaction zone a bed of catalyst comprising aluminum chloride supported on a solid granular adsorptive material, maintaining in the upper portion of said reaction zone a bed of solid granular adsorptive material, introducing aluminum chloride into said reaction zone at an intermediate portion thereof below said bed of said adsorptive material contained in the upper portion of said reaction zone, passing said aluminum chloride downwardly through said reaction zone in contact with and countercurrent to the flow of said hydrocarbons whereby said hydrocarbons progressively comes in contact with more active aluminum chloride as it passes through said reaction zone to the point of entry of said aluminum chloride, maintaining an upwardly decreasing temperature gradient in the lower portion of said reaction zone containing the catalyst bed by introducing a portion of said saturated hydrocarbons into said reaction zone through a plurality of points at different elevations in said reaction zone, allowing the treated hydrocarbon to continue to pass upwardly through said reaction zone and contacting said adsorptive material contained in the upper portion thereof whereby a portion of said aluminum chloride dissolved in said treated hydrocarbons is adsorbed by said adsorptive material.

HAROLD J. HEPP.

References Cited in the file of this patent

UNITED STATES PATENTS

| Number | Name | Date |
|---|---|---|
| 2,404,499 | Iverson | July 23, 1946 |
| 2,405,386 | Wolk | Aug. 6, 1946 |
| 2,408,186 | Atwell et al. | Sept. 24, 1946 |
| 2,439,301 | Hudson et al. | Apr. 6, 1948 |